United States Patent
Tsai

(10) Patent No.: US 9,249,814 B2
(45) Date of Patent: Feb. 2, 2016

(54) SPLIT TYPE HANGING BUCKLE

(71) Applicant: Hai Pin Tsai, Hong Kong (CN)

(72) Inventor: Hai Pin Tsai, Hong Kong (CN)

(*) Notice: Subject to any disclaimer, the term of this patent is extended or adjusted under 35 U.S.C. 154(b) by 126 days.

(21) Appl. No.: 14/029,854

(22) Filed: Sep. 18, 2013

(65) Prior Publication Data
US 2015/0074949 A1 Mar. 19, 2015

(51) Int. Cl.
*A45F 5/00* (2006.01)
*A44B 11/25* (2006.01)
*F16B 2/20* (2006.01)
*A44B 15/00* (2006.01)
*A45F 5/02* (2006.01)

(52) U.S. Cl.
CPC . *F16B 2/20* (2013.01); *A44B 15/00* (2013.01); *A45F 5/02* (2013.01); *Y10T 24/1394* (2015.01)

(58) Field of Classification Search
CPC ...... A44B 11/2584; A44B 15/00; F16B 2/20; Y10T 24/3408; Y10T 24/1394; Y10T 24/1397; Y10T 24/1379; Y10T 24/4736; Y10T 24/4745; A45F 5/02
USPC .......................................................... 24/297
See application file for complete search history.

(56) References Cited

U.S. PATENT DOCUMENTS

| | | | | |
|---|---|---|---|---|
| 3,700,206 A * | 10/1972 | Jones | ............................... | 251/84 |
| 4,614,321 A * | 9/1986 | Andre | ........................... | 248/74.2 |
| 5,106,223 A * | 4/1992 | Kraus | ............................... | 403/11 |
| 5,353,441 A * | 10/1994 | Lazorchak | ........................ | 2/303 |
| 5,622,296 A * | 4/1997 | Pirhonen et al. | ............... | 224/197 |
| 5,927,580 A * | 7/1999 | Ward-Llewellyn | ............ | 224/272 |
| 6,484,370 B2 * | 11/2002 | Kanie et al. | ...................... | 24/297 |
| 7,178,855 B2 * | 2/2007 | Catron et al. | ............... | 296/146.7 |
| 2001/0042273 A1 * | 11/2001 | Chaffee | ........................ | 5/655.3 |
| 2004/0083583 A1 * | 5/2004 | Bradley et al. | .................. | 24/297 |
| 2004/0159208 A1 * | 8/2004 | Yasunori | ......................... | 84/329 |
| 2007/0099469 A1 * | 5/2007 | Sorensen | ....................... | 439/289 |
| 2008/0209698 A1 * | 9/2008 | Colorado | ...................... | 24/595.1 |
| 2010/0199467 A1 * | 8/2010 | Morejon | .......................... | 24/442 |
| 2010/0327031 A1 * | 12/2010 | Olmos | ............................ | 224/269 |
| 2011/0240493 A1 * | 10/2011 | Adams et al. | ................. | 206/216 |
| 2013/0048813 A1 * | 2/2013 | Liu et al. | ................... | 248/222.11 |

* cited by examiner

*Primary Examiner* — Robert J Sandy
*Assistant Examiner* — Louis Mercado
(74) *Attorney, Agent, or Firm* — Garcia-Zamor IP Law; Ruy M. Garcia-Zamor

(57) ABSTRACT

A split type hanging buckle can include a main body and a connection part. Wherein a buckle base, in which a buckling cavity is formed, may be arranged on the hanging buckle main body, and an opening of the buckling cavity is divided into an inserting segment and a buckling segment that are connected with each other. A clamping neck may be formed at the position where the inserting segment is connected with the buckling segment. An aperture of the clamping neck can be equal to that of the buckling segment. At least one side of the clamping neck can be provided with an elastic clamping key. One end of an inserting shaft that can be inserted into the buckling cavity is provided with a clamping head. The diameter of the clamping head may be greater than the aperture of the buckling segment.

7 Claims, 9 Drawing Sheets

SPLIT TYPE HANGING BUCKLE

TECHNICAL FIELD

The present invention relates to technical field of the pendant and accessories, specifically to a split type hanging buckle used to hang keys, mobile phone, name tag and so on.

BACKGROUND ART

In the daily life, the hanging buckle is usually used to hang keys, mobile phone, name tag and so on. Generally, the traditional hanging buckle includes a base part that is provided with hook to hook or clamp fixing members like straps, as well as a hanging buckling member used to hang ID cards, name tags, keys, mobile phone and so on. The hook member and hanging member of this type of traditional hanging buckle are separately connected on the base part.

To prevent stuffs hung on the hanging member from falling off, the hook member and hanging member are generally fixedly connected with the base part so they are not easy to be separated. For example, a staff badge hanger disclosed in the Chinese patent 201320039323.2, which comprises a hanging buckle, a connecting member and a strap mechanism, wherein the hanging buckle is connected with the strap mechanism through the connecting member; the strap mechanism can be provided with clamp or hook on the outer case body thereof to form the base part that can be hooked or clamped on the clothes or strap; the hanging buckle is the hanging member used to hang stuffs, and the connecting member is used to connect the strap mechanism and the hanging buckle. In this type of staff badge hanger, although the distance between the staff badge and the strap mechanism can be adjusted through the scrolled strap, the stuffs hung thereon cannot be taken off easily, which influences the flexibility in the actual use.

As stated above, it is necessary to further improve the structure of the existing hanging buckle.

SUMMARY OF THE INVENTION

The present invention aims to provide a split type magnetic hanging buckle, to solve the main technical problem that: the traditional hanging buckle can effectively prevent the stuffs hung thereon from falling off but the stuffs cannot be taken off easily, which influences the flexibility in the actual use.

In order to solve the above technical problem, the technical proposal of the present invention is as follows:

The present invention claims a split type hanging buckle, comprising:

a hanging buckle main body, on which a buckle base is arranged; a buckling cavity is formed in the buckle base, and opening of the buckling cavity is divided into an inserting segment and a buckling segment that are connected with each other; aperture of the buckling segment is less than that of the inserting segment, and a clamping neck, which is contracted inwards, is formed at the position where the inserting segment is connected with the buckling segment; aperture of the clamping neck is equal to that of the buckling segment, at least one side of the clamping neck is provided with an elastic clamping key; two sides of the clamping neck are located between two elastic clamping keys, or distance from one elastic key to the other side of the relevant clamping neck is less than the aperture of the buckling segment;

and a connection part, on which an inserting shaft is arranged to be inserted into the buckling cavity; diameter of the inserting shaft is smaller than or equal to the aperture of the buckling segment and greater than aperture of the clamping neck; one end of the inserting shaft that is inserted into the buckling cavity is provided with a clamping head, diameter of which is greater than the aperture of the buckling segment and smaller than or equal to aperture of the inserting segment.

Preferably, a circular stepped hole is formed on the opening of the buckling cavity at the hole shoulder of the buckling segment, and outer circumference of the stepped hole is tangent to the elastic clamping key; aperture of the stepped hole is not greater than that of the inserting segment, and a circular flange is formed at the other end of the inserting shaft relative to the clamping head; diameter of the circular flange is greater than the aperture of the buckling segment and less than or equal to the aperture of the stepped hole; length of the inserting shaft from the shaft end surface of the clamping head to the circular flange is smaller than the distance from the bottom wall of the buckling cavity to the hole shoulder of the stepped hole, and greater than or equal to distance from the bottom wall of the buckling cavity to bottom wall of the stepped hole.

Preferably, there is magnetic material provided in bottom wall of the buckling cavity relative to the opening of the buckling cavity, and there is also magnetic material provided in the clamping head of the inserting shaft.

Preferably, a permanent magnet is inserted in any one of the bottom wall of the buckling cavity and the clamping head, and the other one is inserted with metal, cobalt and nickel materials that can attract with the permanent magnet.

Preferably, one or more of hook, clamp or pin are arranged on the hanging buckle main body at the side opposite to the opening of the buckle base.

Preferably, a hanging hook is provided on the hanging buckle main body, and an elastic arm used to unidirectionally seal opening of the hanging hook is provided on the opening of the hanging hook.

Preferably, a hanging ring is provided on the hanging buckle main body.

Preferably, the hanging buckle main body is a chest card holder.

Preferably, a suspension clasp is provided on the connection part.

Preferably, the connection part is a name tag with a card containing part; and end surface of the other end of the inserting shaft relative to the clamping head is fixedly connected to back of the name tag.

Compared to the prior art, the beneficial effects of the present invention are as follows: the connecting part on which the stuffs are hung can be taken off from the hanging buckle main body, and the fastening structure between the hanging buckle main body and the connecting part is simple; at the same time, the inserting shaft is limited in the buckling segment by using interference fit between the clamping neck and the inserting shaft through distance between the elastic clamping keys at both sides of the clamping neck; besides, the attractive force of the magnet enables the clamping head to automatically align with the cavity opening, thus to realize easy buckling, as well as convenient and stable fastening. And it is easy and convenient to take off the stuffs hung on the connecting part. It is only necessary to push the inserting shaft from the buckling segment towards the inserting segment and overcome the resistance of the interference fit from the clamping neck to the inserting shaft, which greatly improves the flexibility of the hanging buckle in actual use.

DETAILED DESCRIPTION OF THE PREFERRED EMBODIMENTS

Figure 1:
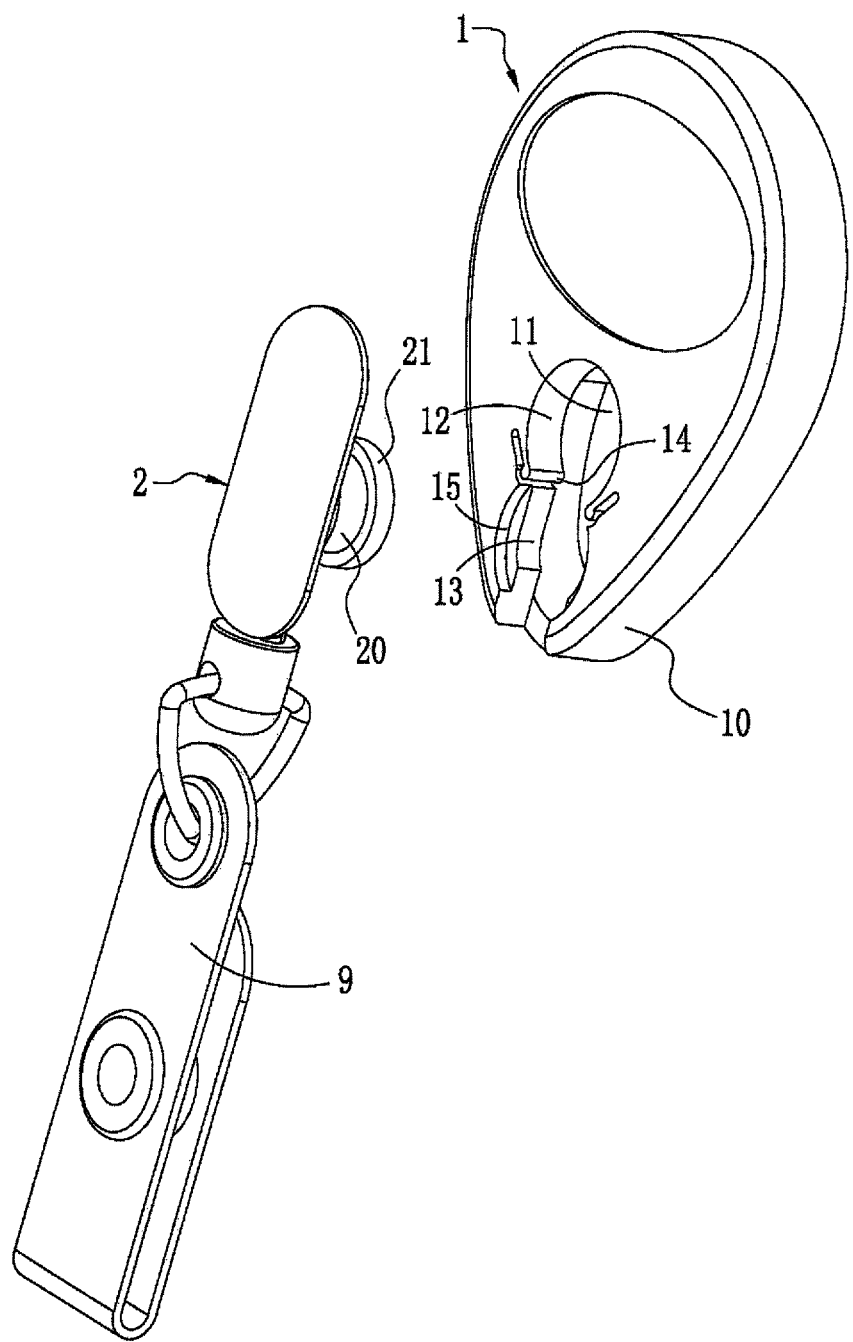
FIG. 1 is the breakdown structure diagram of the hanging buckle main body and the connecting part of the present invention.
Figure 2:
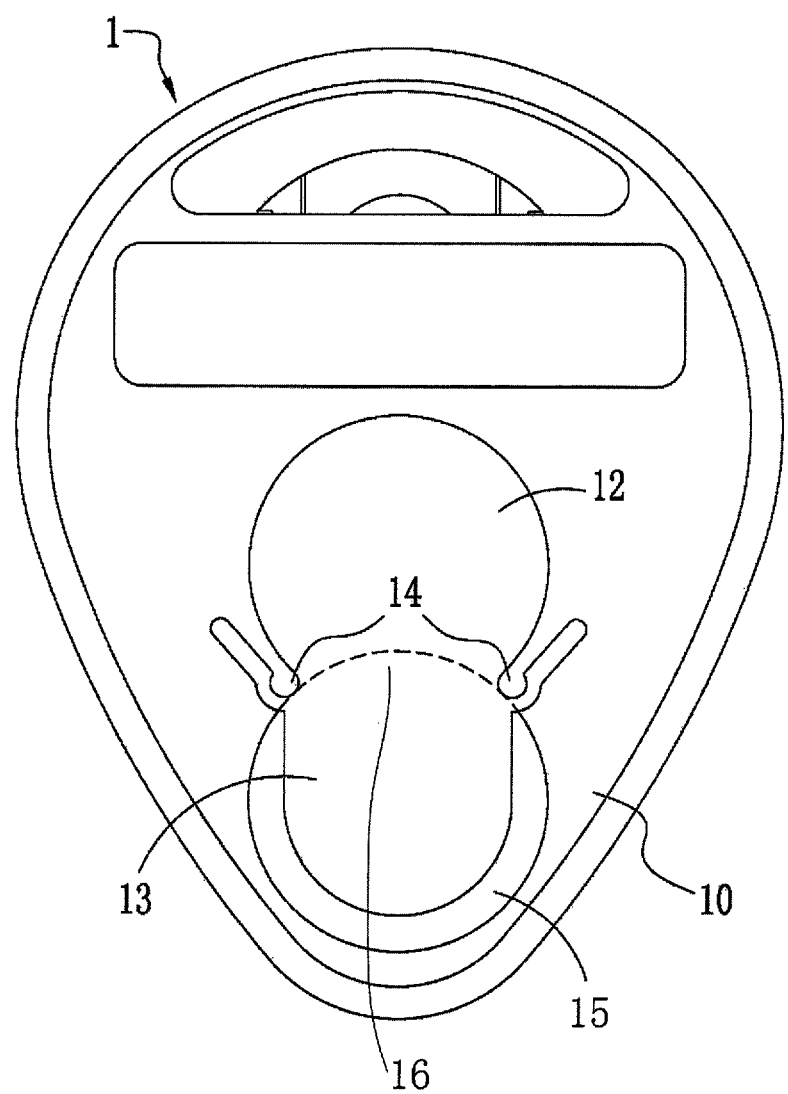
FIG. 2 is the orthographic drawing of the hanging buckle main body of the present invention.
Figure 3:
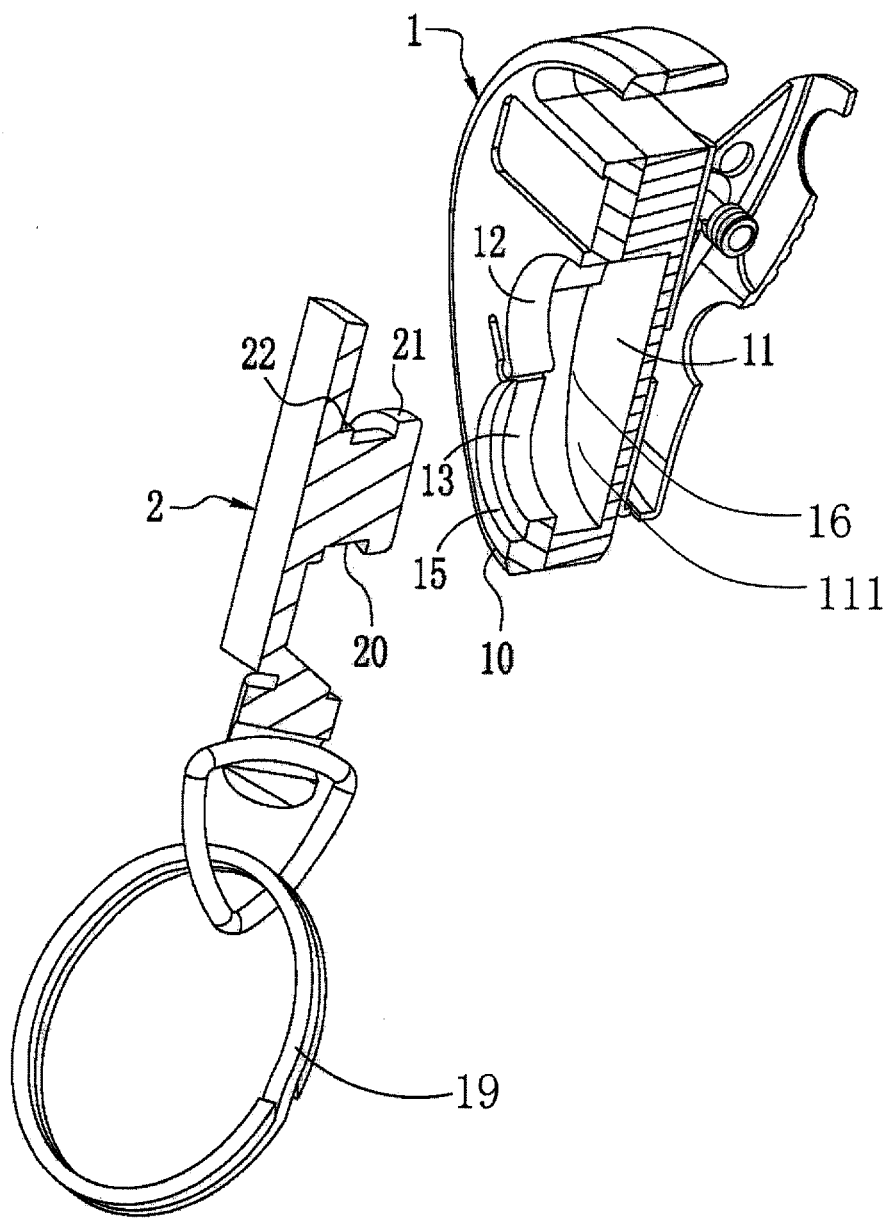
FIG. 3 is the local sectional drawing of a three-dimensional exploded view of the present invention.

The following is the detailed explanation to the split type of hanging buckle of the present invention, in combination with the FIG. 1 to FIG. 9 as well as preferred embodiments.

As shown in FIG. 1 to FIG. 9, the present invention claims a split type hanging buckle, comprising a hanging buckle main body 1 and a connection part 2; wherein a buckle base 10, in which a buckling cavity 11 is formed, is arranged on the hanging buckle main body 1, and opening of the buckling cavity 11 is divided into an inserting segment 12 and a buckling segment 13 that are connected with each other; aperture of the buckling segment 13 is less than that of the inserting 12 segment, and a clamping neck 16, which is contracted inwards, is formed at the position where the inserting segment 12 is connected with the buckling segment 13; aperture of the clamping neck 16 is equal to that of the buckling segment 13, at least one side of the clamping neck 16 is provided with an elastic clamping key 14; two sides of the clamping neck 16 are located between two elastic clamping keys 14, or distance from one elastic key 14 to the other side of the relevant clamping neck 16 is less than the aperture of the buckling segment 13; an inserting shaft 20 is arranged on the connection part 2 to be inserted into the buckling cavity 11, and diameter of the inserting shaft 20 is smaller than or equal to the aperture of the buckling segment 13 and greater than aperture of the clamping neck 16; one end of the inserting shaft 20 that is inserted into the buckling cavity 11 is provided with a clamping head 21, diameter of which is greater than the aperture of the buckling segment 13 and smaller than or equal to aperture of the inserting segment 12.

During implementation of the present invention, the clamping head 21 can be inserted into the inserting segment 12 at the cavity opening, the inserting shaft 20 is pulled downwards to overcome the resistance of the elastic clamping key 14 in the clamping neck 16 and enter the buckling segment 13, where the inserting shaft 20 is limited by the elastic clamping key 14. When it is necessary to separate the hanging buckle main body 1 and the connection part 2, it is only necessary to push the inserting shaft 20 from the buckling segment 13 to the inserting segment 12 and overcome the resistance from the elastic clamping key 14 to the inserting shaft 20, which greatly improves the flexibility of the present invention.

Embodiment 1 there is magnetic material provided in bottom wall of the buckling cavity relative to the opening of the buckling cavity 11, and there is also magnetic material provided in the clamping head 21 of the inserting shaft 20, thereby the clamping head 21 is attracted with the buckling cavity 11. In the embodiment, attractive force of the magnetic material enables the clamping head 21 to automatically align with the opening of the buckling cavity 11, so it is unnecessary to pay much attention to insert the clamping had 21 into the buckling cavity 11.

Embodiment 2 a permanent magnet 211 is inserted in any one of the bottom wall of the buckling cavity 11 and the clamping head 21, and the other one is inserted with metal 111, cobalt and nickel materials that can attract with the permanent magnet 211. In the embodiment, the clamping head 21 can be accurately aligned without being influenced by the strength of magnet.

Embodiment 3 as shown in FIGS. 1, 2, 3, 7 and 8, a circular stepped hole 15 is formed on the opening of the buckling cavity 11 at the hole shoulder of the buckling segment 13, and outer circumference of the stepped hole 15 is tangent to the elastic clamping key 14; aperture of the stepped hole 15 is not greater than that of the inserting segment 12, and a circular flange 22 is formed at the other end of the inserting shaft relative to the clamping head 21; diameter of the circular flange 22 is greater than the aperture of the buckling segment 13 and less than or equal to the aperture of the stepped hole 15; length of the inserting shaft 20 from the shaft end surface of the clamping head 21 to the circular flange 22 is smaller than the distance from the bottom wall of the buckling cavity 11 to the hole shoulder of the stepped hole 15, and greater than or equal to distance from the bottom wall of the buckling cavity 11 to bottom wall of the stepped hole 15. During implementation of this embodiment, the interference fit between the circular flange 22 and the elastic clamping key 14 at two sides of the clamping neck 16 can be used to further enhance the limitation to the motion of the inserting shaft 20 between the inserting segment 12 and the buckling segment 13.

Embodiment 4 as shown in FIGS. 4, 5, 6, and 9, one or more of hook 3, clamp 4 or pin 5 are arranged on the hanging buckle main body 1 at the side opposite to the opening of the buckle base 10. The hanging buckle main body 1 can be fixed or connected to a connection place through the hook 3, clamp 4 or pin 5 in the embodiment.

Figure 4:
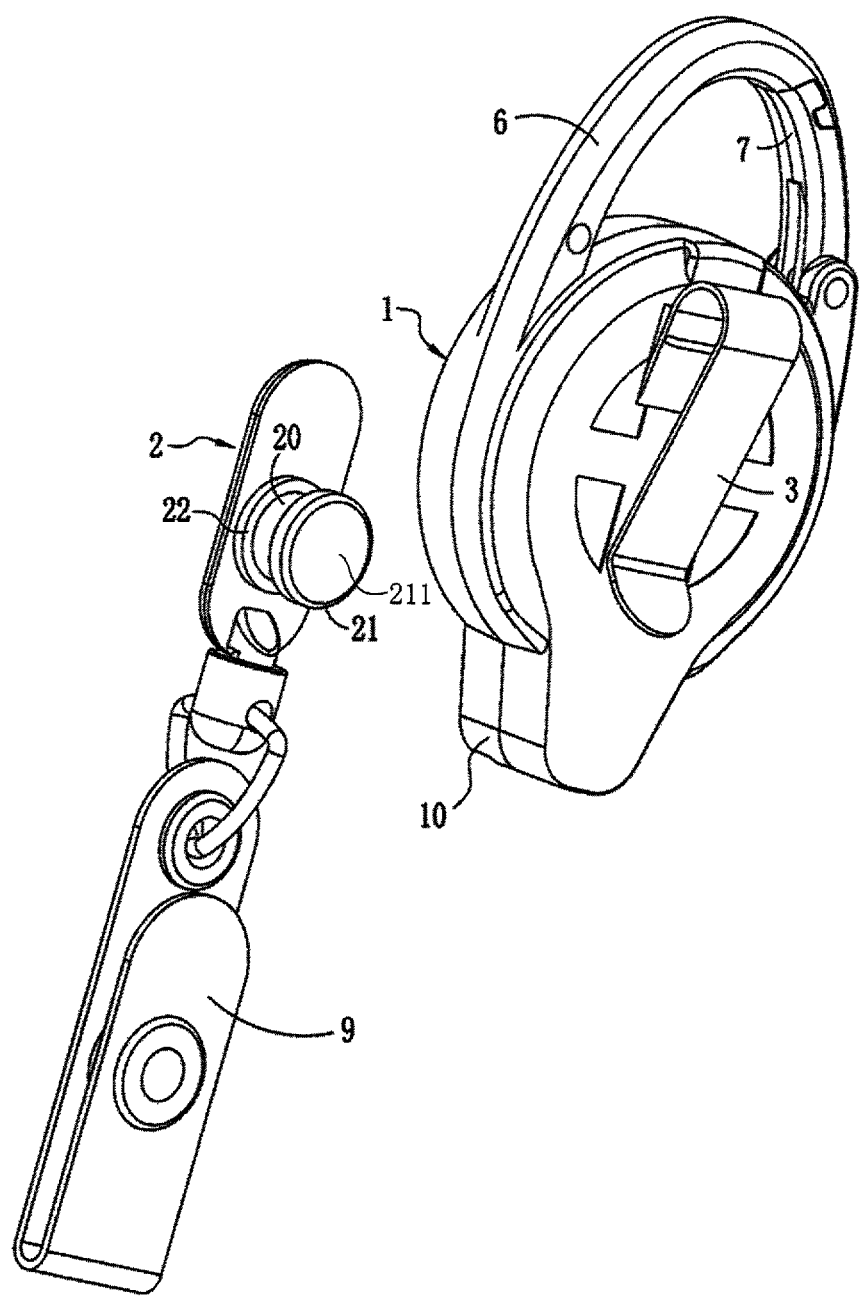
FIG. 4 is the structure diagram of another embodiment of the present invention.

Embodiment 5 as shown in FIG. 4, a hanging hook 6 is provided on the hanging buckle main body 1, and an elastic arm 7 used to unidirectionally seal opening of the hanging hook 6 is provided on the opening of the hanging hook 6. The hanging buckle main body 1 of the present invention can be fixedly hooked to different kinds of straps or holes through the hanging hook 6.

Figure 5:
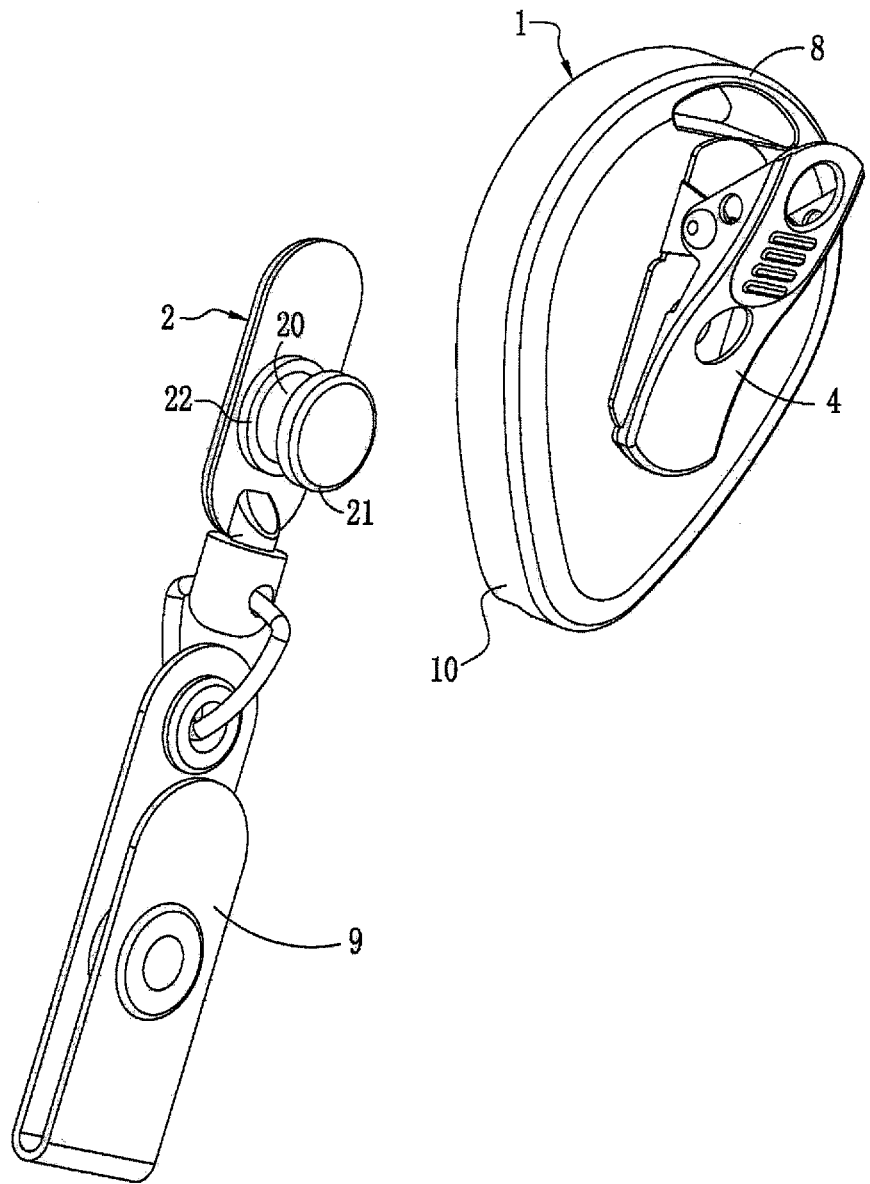
FIG. 5 is the schematic diagram of a hanging buckle main body with clamp and hanging ring of the present invention.
Figure 6:
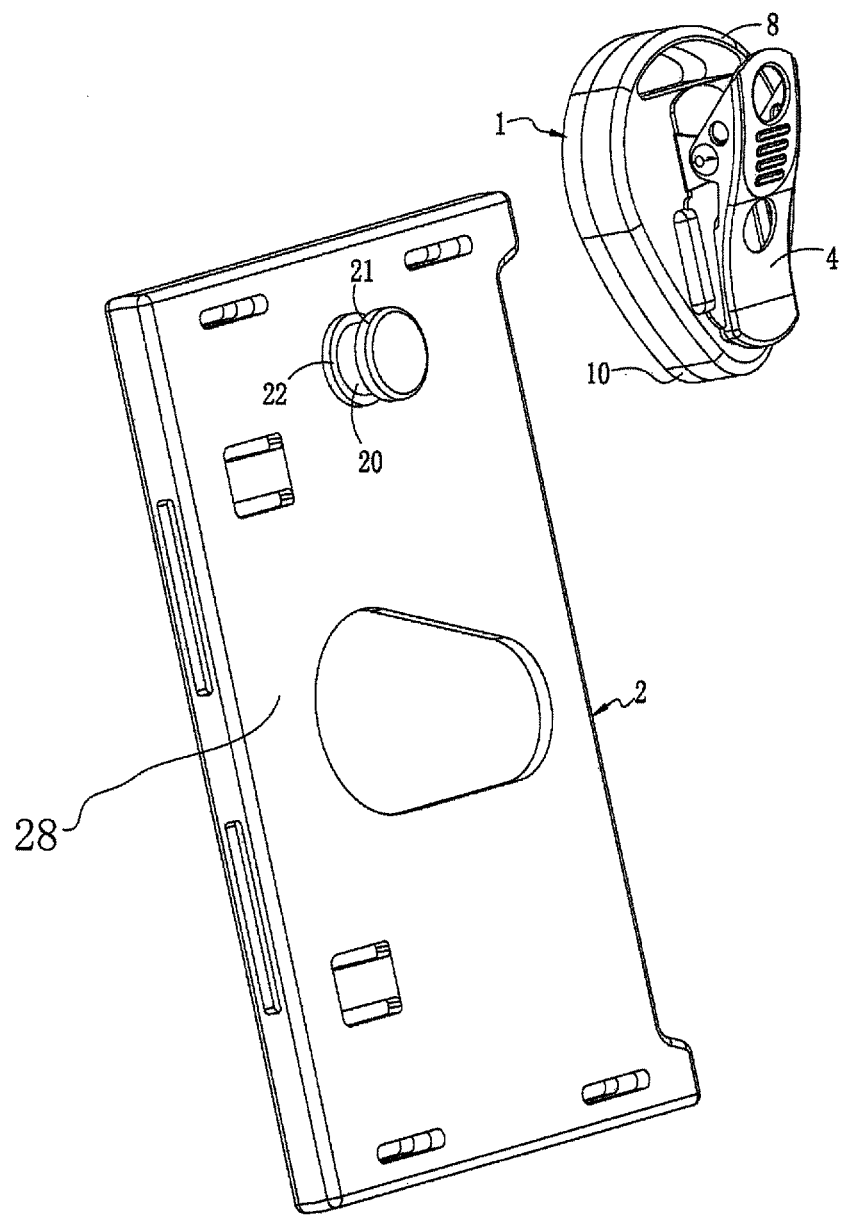
FIG. 6 is the schematic diagram of an embodiment in which the connecting part is a name tag.
Figure 7:
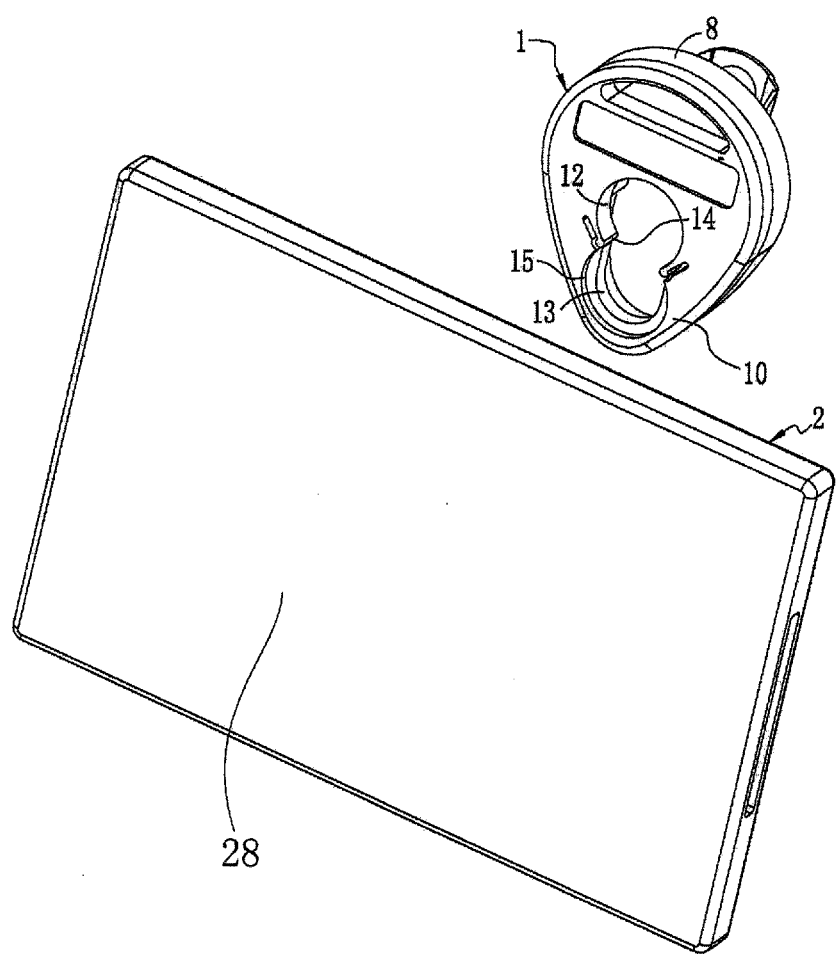
FIG. 7 is the schematic diagram of another embodiment in which the connecting part is a name tag.

Embodiment 6 as shown in FIGS. 5, 6 and 7, a hanging ring 19 is provided on the hanging buckle main body. The hanging buckle main body 1 can be hung on strap through the hanging ring 19.

Figure 8:
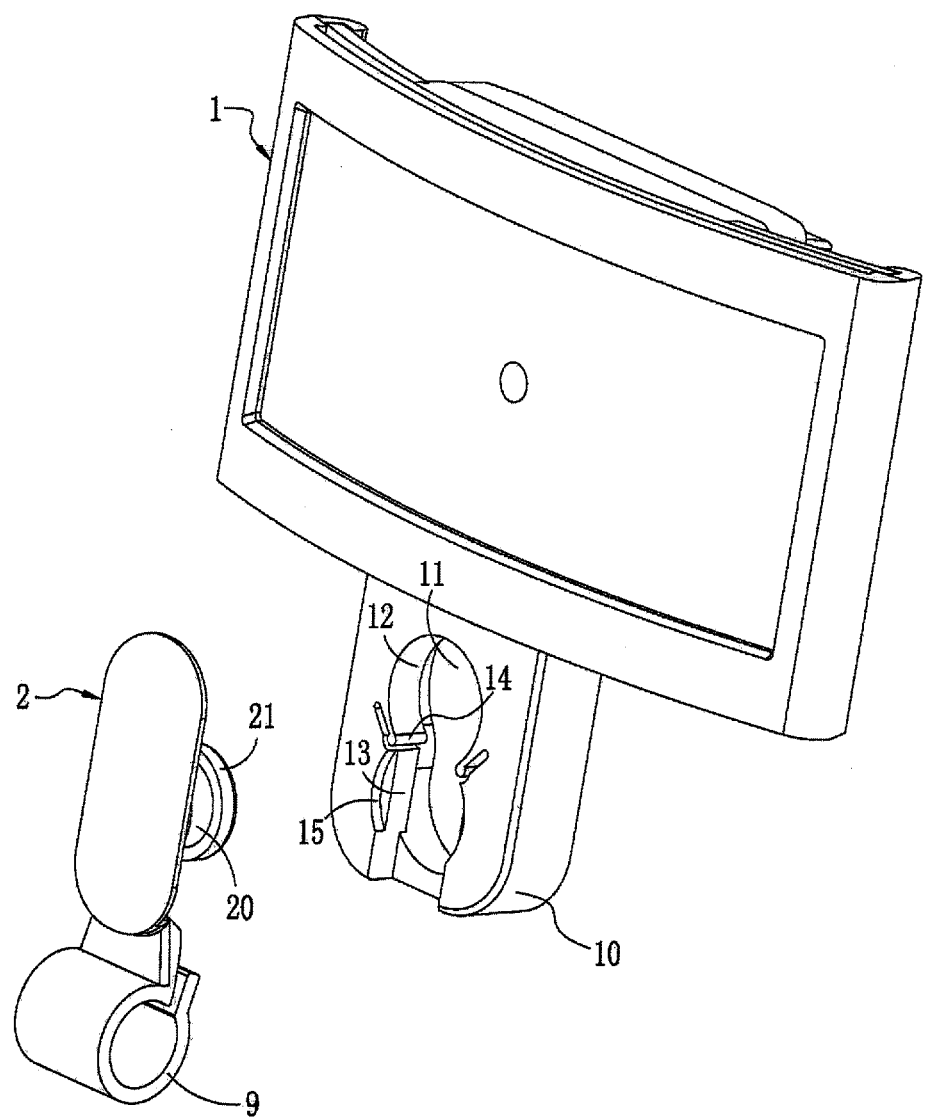
FIG. 8 is the schematic diagram of an embodiment in which the connecting part is a chest card holder.
Figure 9:
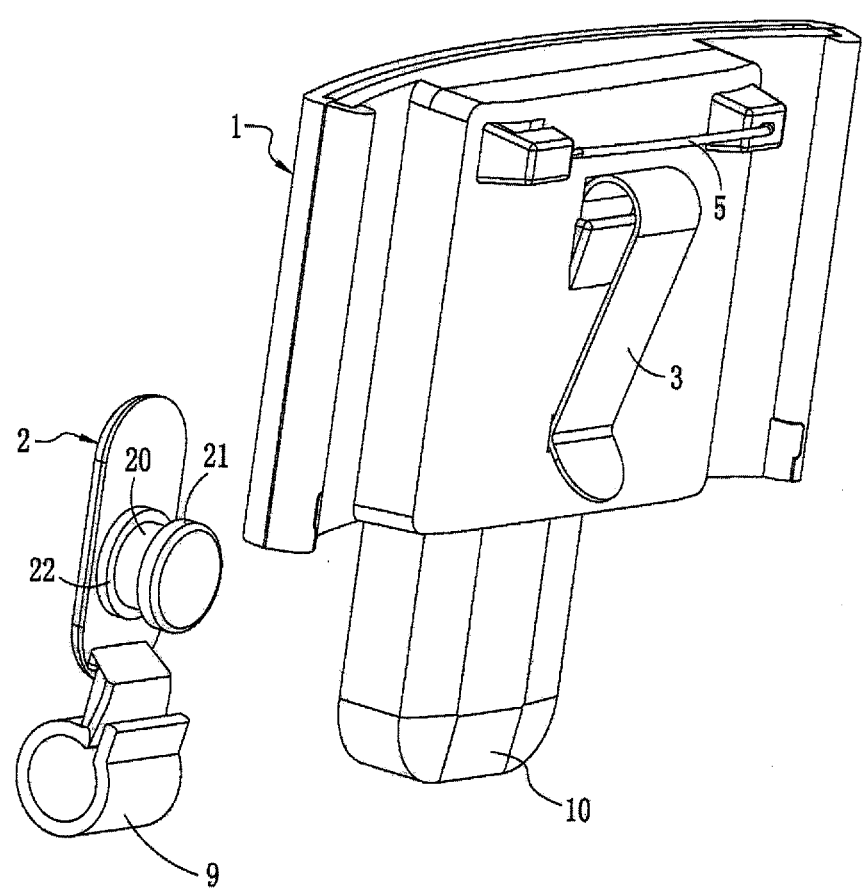
FIG. 9 is the schematic diagram of FIG. 8 from another angle.

Embodiment 7 as shown in FIGS. 8 and 9, the hanging buckle main body 1 is a chest card holder.

Embodiment 8 as shown in FIGS. 1, 3, 4 and 5, a suspension clasp 9 is provided on the connection part 2. The hanging ring 19 can be used to hang the stuffs onto the connection part 2 which can be buckled to the hanging buckle main body 1. As shown in FIGS. 8 and 9, the suspension clasp 9 is an elastic split ring.

Embodiment 9 as shown in FIGS. 6 and 7, the connection part 2 is a name tag 28 with a card containing part; and end surface of the other end of the inserting shaft 20 relative to the clamping head 21 is fixedly connected to back of the name tag 28. The clamping head 21 can be fixedly connected to back of the name tag 28 near the long or short edge.

The explanation above is only the detailed implementation method of the present invention, but the protective scope of the present invention is not limited by it. Any technical personnel familiar with this field can easily develop modification or replacement within the technical scope disclosed by the present invention, all the modifications and replacements should be in the protective scope of the present invention. Therefore, the protective scope of the present invention should be as defined by the claims.

What is claimed is:

1. A split type hanging buckle, comprising:
a hanging buckle main body, on which a buckle base is arranged; a buckling cavity is formed in the buckle base, and an opening of the buckling cavity is divided into an inserting segment and a buckling segment that are connected with each other; an aperture of the buckling segment is less than an aperture of the inserting segment, and a clamping neck, which is contracted inwards, is formed at a position where the inserting segment is connected with the buckling segment; at least one side of the clamping neck is provided with an elastic clamping key; two sides of the clamping neck are located between two elastic clamping keys, or a distance from one elastic clamping key to another side of a relevant clamping neck is less than the aperture of the buckling segment;
and a connection part, on which an inserting shaft is arranged to be inserted into the buckling cavity; wherein a diameter of the inserting shaft is smaller than or equal to the aperture of the buckling segment and greater than an aperture of the clamping neck; one end of the inserting shaft that is inserted into the buckling cavity is provided with a clamping head; wherein a diameter of the clamping head is greater than the aperture of the buckling segment and smaller than or equal to the aperture of the inserting segment;
wherein a bottom wall of the buckling cavity relative to the opening of the buckling cavity is made from magnetic material, and the clamping head of the inserting shaft is made from the magnetic material, a circular stepped hole is formed on the opening of the buckling cavity at a hole shoulder of the buckling segment, and an outer circumference of the stepped hole is tangent to the elastic clamping key; an aperture of the stepped hole is not greater than that of the inserting segment, and a circular flange is formed at other end of the inserting shaft relative to the clamping head; a diameter of the circular flange is greater than the aperture of the buckling segment and less than or equal to the aperture of the stepped hole: a length of the inserting shaft from a shaft end surface of the clamping head to the circular flange is smaller than a distance from the bottom wall of the buckling cavity to the hole shoulder of the stepped hole, and greater than or equal to a distance from the bottom wall of the buckling cavity to a bottom wall of the stepped hole.

2. The split type hanging buckle according to claim 1, wherein one or more of hook, clamp or pin are arranged on the hanging buckle main body at a side opposite to the opening of the buckle base.

3. The split type hanging buckle according to claim 2, wherein a hanging hook is provided on the hanging buckle main body, and an elastic arm used to unidirectionally seal an opening of the hanging hook is provided on the opening of the hanging hook.

4. The split type hanging buckle according to claim 3, wherein a suspension clasp is provided on the connection part.

5. The split type hanging buckle according to claim 2, wherein a hanging ring is provided on the hanging buckle main body.

6. The split type hanging buckle according to claim 5, wherein the connection part is a name tag with a card containing part; and an end surface of the other end of the inserting shaft relative to the clamping head is fixedly connected to a back of the name tag.

7. The split type hanging buckle according to claim 2, wherein the hanging buckle main body is a chest card holder.

* * * * *